(12) United States Patent
Zhang et al.

(10) Patent No.: US 11,733,034 B2
(45) Date of Patent: Aug. 22, 2023

(54) FAST MEASUREMENT METHOD FOR MICRO-NANO DEEP GROOVE STRUCTURE BASED ON WHITE LIGHT INTERFERENCE

(71) Applicant: ZHEJIANG UNIVERSITY, Zhejiang (CN)

(72) Inventors: Kexin Zhang, Zhejiang (CN); Yiyong Liang, Zhejiang (CN); Guozhong Li, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 18/082,552

(22) Filed: Dec. 15, 2022

(65) Prior Publication Data

US 2023/0118227 A1   Apr. 20, 2023

Related U.S. Application Data

(63) Continuation-in-part of application No. PCT/CN2022/089613, filed on Apr. 27, 2022.

(30) Foreign Application Priority Data

Jun. 25, 2021   (CN) .......................... 202110710393.5

(51) Int. Cl.
*G01B 9/02*   (2022.01)
*G01B 11/24*   (2006.01)
*G01N 21/01*   (2006.01)

(52) U.S. Cl.
CPC ......... *G01B 11/2441* (2013.01); *G01N 21/01* (2013.01); *G01N 2021/0106* (2013.01)

(58) Field of Classification Search
CPC ............ G01B 11/2441; G01B 9/02085; G01B 9/0209; G01B 9/02091; G01B 11/0608; G01N 21/01; G01N 2021/0106
See application file for complete search history.

(56) References Cited

U.S. PATENT DOCUMENTS

| 5,633,715 A | * | 5/1997 | Ai | ....................... | G01B 9/02083 |
| | | | | | 356/497 |
| 2012/0257213 A1 | * | 10/2012 | Schonleber | ........ | G01B 9/02091 |
| | | | | | 356/485 |

(Continued)

FOREIGN PATENT DOCUMENTS

| CN | 101266139 | 9/2008 |
| CN | 102082108 | 6/2011 |

(Continued)

OTHER PUBLICATIONS

K. Zhang, Y. Liang and G. Li, "An Accelerated Algorithm for 3D Reconstruction of Groove Structure Based on Parallel Light and White Light Interference," 2021 International Conference of Optical Imaging and Measurement (ICOIM), Xi'an, China, 2021, pp. 53-57, doi: 10.1109/ICOIM52180.2021.9524424 (Year: 2021).*

(Continued)

*Primary Examiner* — Uzma Alam
*Assistant Examiner* — Jonathon Cook
(74) *Attorney, Agent, or Firm* — JCIPRNET

(57) ABSTRACT

A fast measurement method for micro-nano deep groove structure based on white light interference, including: establishing a white light interference system, using the white light interference system to measure the structure of the groove, the CCD camera collects and obtains multiple groups of groove interferograms and the serial number corresponding to each groove interferogram in each group; processing each group of groove interferograms of the groove sample to obtain the maximum contrast of each group of groove interferograms and the 3D reconstruction diagram of the local structure; extracting the interface reconstruction diagram in the 3D reconstruction diagram of the local structure according to each group of the groove interferograms; after splicing the interface reconstruction diagrams corresponding to all groups of groove interferograms, (Continued)

obtaining a 3D structural reconstruction diagram of the groove sample, and measuring the depth and width of the groove sample according to the 3D structural reconstruction diagram.

5 Claims, 4 Drawing Sheets

(56) References Cited

U.S. PATENT DOCUMENTS

| | | | | |
|---|---|---|---|---|
| 2014/0233016 A1* | 8/2014 | Aiyer | ................ | G01B 9/02091 |
| | | | | 356/497 |
| 2019/0137265 A1* | 5/2019 | Boulanger | ......... | G01B 11/2441 |

FOREIGN PATENT DOCUMENTS

| | | |
|---|---|---|
| CN | 112097645 | 12/2020 |
| CN | 113465534 | 10/2021 |
| JP | H11202265 | 7/1999 |

OTHER PUBLICATIONS

"International Search Report (Form PCT/ISA/210) of PCT/CN2022/089613," dated Sep. 28, 2022, pp. 1-4.

"Written Opinion of the International Searching Authority (Form PCT/ISA/237) of PCT/CN2022/089613," dated Sep. 28, 2022, pp. 1-5.

* cited by examiner a b c

FAST MEASUREMENT METHOD FOR MICRO-NANO DEEP GROOVE STRUCTURE BASED ON WHITE LIGHT INTERFERENCE

CROSS-REFERENCE TO RELATED APPLICATION

This application is a continuation in part of international PCT application serial no. PCT/CN2022/089613, filed on Apr. 27, 2022, which claims the priority benefit of China application no. 202110710393.5, filed on Jun. 25, 2021. The entirety of each of the above-mentioned patent applications is hereby incorporated by reference herein and made a part of this specification.

BACKGROUND

Technical Field

The disclosure relates to a groove structure measurement method in the field of integrated circuit (IC) and microelectromechanical system (MEMS) device measurement, in particular to a fast measurement method for micro-nano deep groove structure based on white light interference.

Description of Related Art

In the existing technologies for detecting groove structures, there are mainly the following methods: the methods are divided into contact-type methods and non-contact-type methods. The contact-type method is a stylus-type optical profiler, and optical measurement is a non-contact measurement technology. Optical measurement techniques include optical probe method, scanning tunneling microscopy, laser focusing method, and interference microscopy. Among the above methods, the probe method is found to have the disadvantage of probe breakage, and is easy to cause damage to sensitive elements. Although contact-type measurement method is performed by gradually reducing the size of the probe, as the surface structure of the sample to be measured becomes more complex, there are still some regions that cannot be detected. The main principle of scanning tunneling microscopy is based on the tunnel effect of quantum mechanics, and the particle moving to the barrier higher than the particle energy also has a probability to pass through the barrier. The measurement object of the scanning tunneling microscopy is mainly micro or nano-scale samples, and scanning tunneling microscopy is performed through point measurement which is conducted by point-by-point, line-by-line, and surface-by-surface scanning, which normally takes a long time and has low efficiency. It also takes a long time to find a measurement region on the measured sample. The basic principle of the laser focusing method is that the meter light generated by a laser unit is reflected and the focus information is fed back to a differential photoelectric device, and then processed by the computer to control the vertical movement of the focusing probe, thereby obtaining the surface topography of the sample to be measured, and the operation range falls within the micron level.

In the white light interferometry technique, a micro interference structure is adopted for measurement. Since the light in the micro interference optical path is convergent light, the depth of field of the microscope will be limited in the actual process. Moreover, due to the convergence of the light beam, if the focal plane is above the bottom surface of the groove sample to be detected, interfering light will be generated. Using parallel light interference will increase the depth range of the sample, and theoretically the light can enter the bottom of the sample vertically and exit vertically regardless of the depth of the sample. In the related art, most of the groove structures are aimed at the micron level. The disclosure mainly performs simulation reconstruction for the groove structures at the sub-millimeter level.

In the meantime, if the conventional centroid method and the difference centroid method are directly applied for 3D reconstruction of a structure with a wide depth, a lot of interference will be introduced in the reconstruction process. The algorithm of the disclosure uses contrast information as an evaluation index to extract effective information from a group of scanning interferograms, and then performs three-dimensional reconstruction after processing the diagrams. In this manner, the results obtained are better than those obtained by directly using the centroid method, and the time required is also reduced.

SUMMARY

In order to solve the problems existing in the related art, the present disclosure provides a fast measurement method for micro-nano deep groove structure based on white light interference. By using the characteristics of high detection depth and small error obtained by parallel light white light interference, the parallel light white light interference and acceleration algorithm are combined to realize the three-dimensional topography measurement of the submillimeter-structured grooves.

The technical scheme of the present disclosure is as follows:

The present disclosure includes the following steps:

1) Establishing a white light interference system, including a light source, a beam splitter, a CCD camera and a plane mirror. The white light generated by the light source is incident into the beam splitter for transmission and reflection, and the transmitted light of the beam splitter is reflected by the plane mirror and then incident back into the beam splitter. The transmitted light that is incident back into the beam splitter is reflected in the beam splitter, and the reflected light beam serves as the first beam and is incident on the CCD camera. The reflected light of the beam splitter is reflected by the groove of the groove sample and then incident back into the beam splitter. The reflected light that is incident back to the beam splitter is transmitted through the beam splitter, the transmitted beam serves as the second beam and is incident on the CCD camera. The interference of the first beam and the second beam is detected by the CCD camera, and the CCD camera detects and acquires a groove interferogram;

2) Using the white light interference system to measure the structure of the groove, and recording the number of times of appearance of clear interference fringes in the CCD camera.

According to the number of times of appearance of clear interference fringes, the CCD camera collects and obtains multiple groups of groove interferograms and records the serial number corresponding to each groove interferogram in each group;

3) Performing grayscale processing on each group of groove interferograms of the groove sample to obtain a corresponding groove grayscale interferogram, calculating the contrast of the current group of groove grayscale interferograms, and recording the maximum contrast of the current group of groove grayscale interferograms;

4) According to the current group of groove interferograms and the serial number corresponding to each groove interferogram in the current group, using the centroid method or the difference centroid method to perform local three-dimensional reconstruction of the current group of groove interferograms to obtain a 3D reconstruction diagram of the local structure corresponding to the current group of groove interferograms;

5) Dividing the three-dimensional reconstruction diagram of the local structure in a direction perpendicular to the direction of fringe development in the groove interferogram, obtaining each sub-region of the three-dimensional reconstruction diagram of the local structure, calculating the contrast of each sub-region, and determining whether each sub-region is an interface region according to a preset difference threshold and the maximum contrast; if the sub-region is an interface region, recording the coordinate parameters of the current sub-region, otherwise, not recording the coordinate parameters of the current sub-region; obtaining the coordinate parameters of all interface regions; extracting the interface reconstruction diagram in the 3D reconstruction diagram of the local structure according to the coordinate parameters of all interface regions;

6) Repeating steps 3)-5) for the remaining groups of groove interferograms of the groove sample to obtain the interface reconstruction diagrams corresponding to all groups of groove interferograms of the groove sample;

7) After splicing the interface reconstruction diagrams corresponding to all groups of groove interferograms of the groove sample, a three-dimensional structural reconstruction diagram of the groove sample is obtained, measuring the depth and width of the groove sample according to the three-dimensional structural reconstruction diagram.

The step 2) is specifically as follows:

2.1) Placing the groove sample obliquely along the length direction of the groove, adjusting the inclination angle of the groove sample and the distance between the plane mirror and the beam splitter in the white light interference system or between the groove sample and the beam splitter along the optical axis, until fringes are generated on the image captured by the CCD camera, fixing the inclination angle of the groove sample, the groove sample and the plane mirror;

2.2) Moving the position of the groove sample or plane mirror along the optical axis, and recording the positions of all groove samples or plane mirrors when clear interference fringes appear in the CCD camera and the number of times of appearance of clear interference fringes, and the position of the groove sample or plane mirror with clear interference fringes is denoted as the interface position;

2.3) Moving the position of the groove sample or plane mirror along the optical axis again, using the CCD camera to collect groove interferograms at a preset step size and number each groove interferogram in order, and selecting the required range above and below all interface positions and groove interferograms at all interface positions, taking the required range above and below one interface position and the groove interferogram at the current interface position as a group of groove interferograms of the groove sample, thereby obtaining multiple groups of groove interferograms of the groove sample and the serial number corresponding to each groove interferogram in each group.

In the step 3), calculating the contrast of each group of groove grayscale interferograms is specifically set by the following formula:

$$J = \frac{I\max - I\min}{I\max + I\min}$$

In the formula, J is the contrast of the groove grayscale interferogram, Imax is the maximum grayscale value of the groove grayscale interferogram, and Imin is the minimum grayscale value of the groove grayscale interferogram.

In the step 5), the step of determining whether all the sub-regions are interface regions according to the preset difference threshold and the maximum contrast is specifically as follows:

Taking the absolute value of the contrast difference between the contrast of each sub-region and the maximum contrast as the contrast difference of the current sub-region. If the contrast difference of the current sub-region is less than or equal to the preset difference threshold, then the current sub-region is the interface region, if the contrast difference of the current sub-region is greater than the preset difference threshold, then the current sub-region is not the interface region.

The position of the groove sample or plane mirror with clear interference fringes is specifically the upper surface of the groove sample, the bottom of the groove and the upper surface of the protruding stage in the groove, and the upper surface of the protruding stage is parallel to the upper surface of the groove sample or the bottom of the groove.

The advantageous effects of the present disclosure are:

Compared with the optical path of the existing interference structure, the optical path of the disclosure is more concise, and the method combined with the algorithm is adopted to detect the groove structure of the sub-millimeter level, so it is possible to reach a width in hundreds of microns and a depth in millimeters.

In the present disclosure, when collecting the groove interferogram, the acceleration in the process of collecting the groove interferogram may be realized by skipping rapidly.

In the process of reconstructing the three-dimensional topography of the groove, the present disclosure spends less reconstruction time and has an acceleration effect, the reconstruction time of the three-dimensional structure is reduced compared with the conventional algorithm, and the reconstruction effect is better than that of the conventional centroid method.

In the reconstruction process of three-dimensional topography of the groove, the present disclosure provides a method of firstly reconstructing local parts, and then splicing reconstruction results of the local parts according to image segmentation results, so as to obtain the three-dimensional reconstruction results of the whole sample. This method has an important function in improving the effect and speed of image reconstruction.

The disclosure is able to perform topography detection on the groove with a high aspect ratio in sub-millimeter level by using the combination of white light interference and acceleration algorithm, and it is possible to reach the depth of the detection structure in millimeter level.

DESCRIPTION OF THE EMBODIMENTS

The present disclosure will be described in further detail below in conjunction with the accompanying drawings and specific examples.

The groove samples described in the present disclosure are generally, for example, but not limited to, microelectronics and power semiconductor devices. Since the groove sample used in the present disclosure has only the upper surface of the groove sample and the bottom of the groove, the steps described below takes the groove sample with two surfaces as an example.

Figure 1:
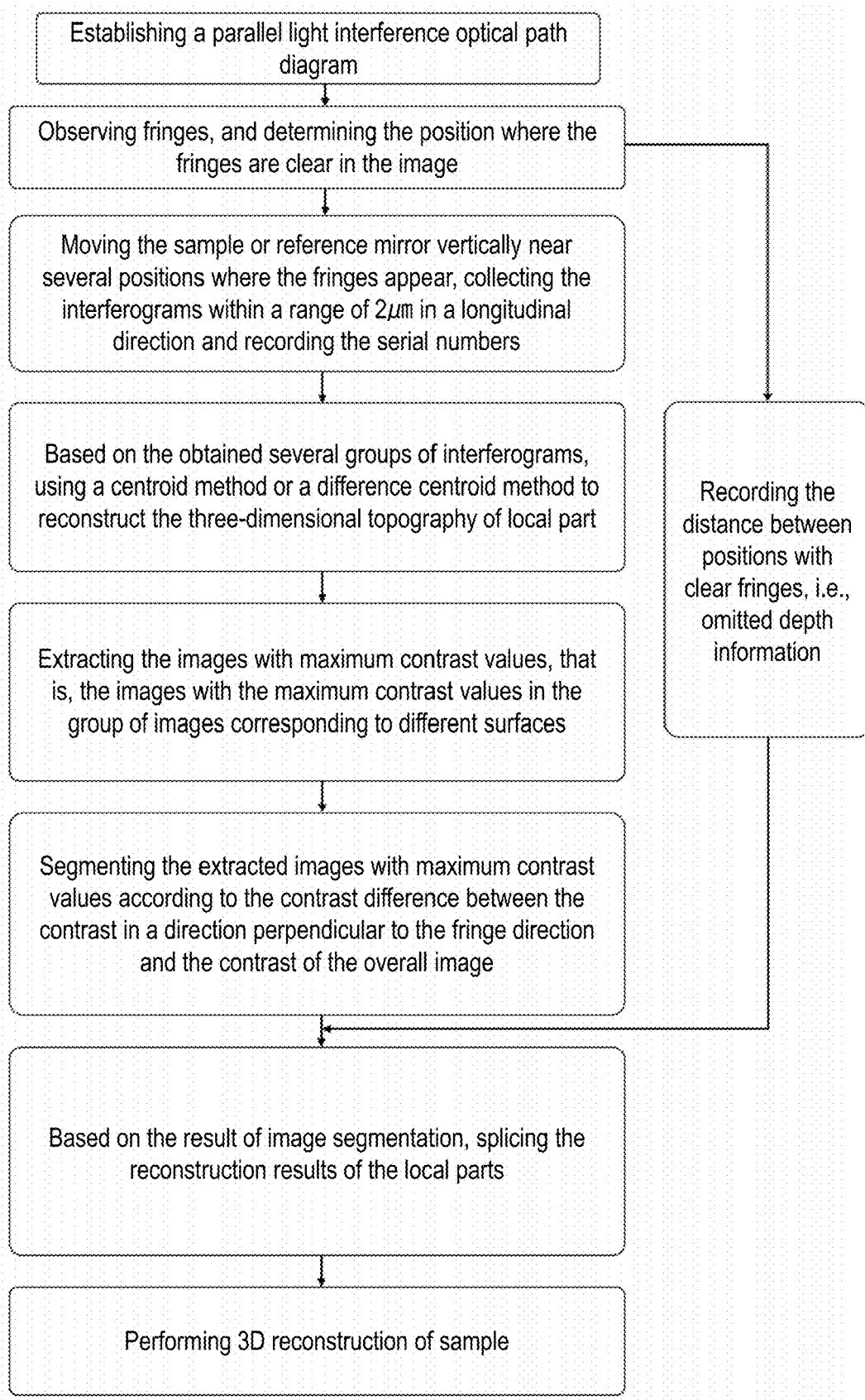
FIG. 1 is an overall flow chart of the present disclosure.
Figure 2:
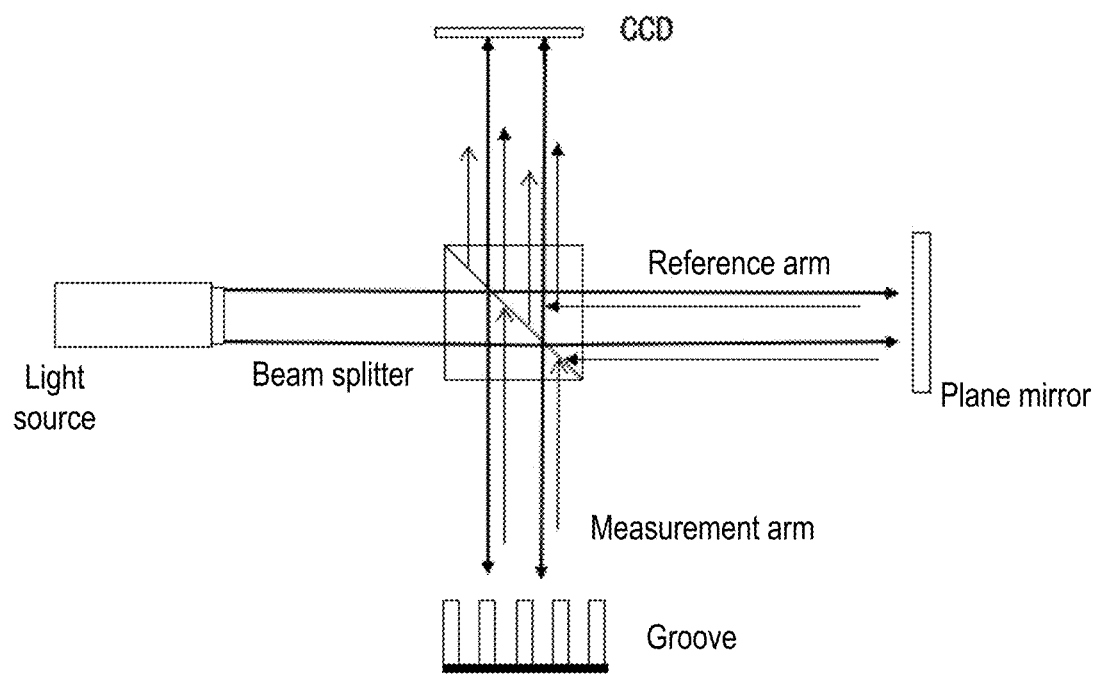
FIG. 2 is an optical path diagram of a white light interference system.

As shown in FIG. 1, the present disclosure includes the following steps:

1) Establishing a white light interference system, as shown in FIG. 2, including a light source, a beam splitter, a CCD camera and a plane mirror. The white light generated by the light source is incident into the beam splitter for transmission and reflection, and the transmitted light of the beam splitter is reflected by the plane mirror and then incident back into the beam splitter. The transmitted light that is incident back into the beam splitter is reflected in the beam splitter, and the reflected light beam serves as the first beam and is incident on the CCD camera. The reflected light of the beam splitter is reflected by the groove and then incident back into the beam splitter. The reflected light that is incident back to the beam splitter is transmitted through the beam splitter, the transmitted beam serves as the second beam and is incident on the CCD camera. The interference of the first beam and the second beam is detected by the CCD camera, and the CCD camera detects and acquires a groove interferogram. The light source is a wide-spectrum light source with a wavelength range of 380 nm-780 nm, that is, the visible light spectral range, within which a wide-spectrum light source with any spectral width may be selected. The optical path of the beam splitter and the plane mirror is the reference arm, and the optical path of the beam splitter and the groove sample is the measurement arm.

2) Using the white light interference system to measure the structure of the groove, and recording the number of times of appearance of clear interference fringes in the CCD camera. According to the number of times of appearance of clear interference fringes, the CCD camera collects and obtains two groups of groove interferograms and records the serial number corresponding to each groove interferogram in each group.

Figure 3:
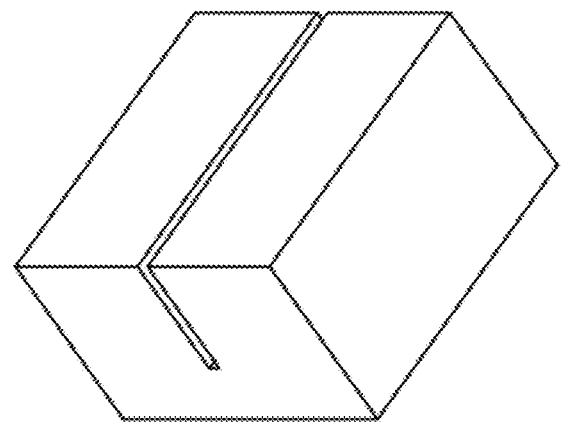
FIG. 3 is a schematic diagram of a groove structure with vertical side walls.
Figure 4:
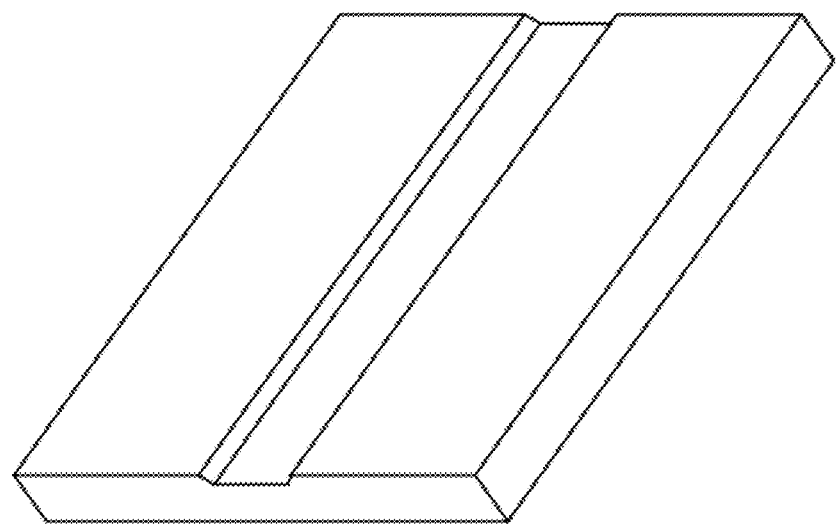
FIG. 4 is a schematic diagram of a groove sample structure with inclined side walls.

The step 2) is specifically as follows:

2.1) Placing the groove sample obliquely along the length direction of the groove, adjusting the inclination angle of the groove sample and the distance between the plane mirror and the beam splitter in the white light interference system or between the groove sample and the beam splitter, until clear fringes are generated on the image captured by the CCD camera, fixing the inclination angle of the groove sample, the groove sample and the plane mirror. The schematic diagram of the groove structure with the vertical side wall is shown in FIG. 3. The size of the groove sample is 5 mm*5 mm, the width of the groove is 0.2 mm, and the depth of the groove is 2 mm. The lengths of the reference arm and the measurement arm of the measurement optical path corresponding to the groove sample are 15 mm. The schematic diagram of the groove sample structure with inclined side wall is shown in FIG. 4. The size of the groove sample is 5 mm*5 mm, the size of the upper part of the groove with inclined side wall is 1 mm*5 mm, the size of the lower part is 0.8 mm*5 mm, and the depth is 0.1 mm. The lengths of the reference arm and the measurement arm of the measurement optical path corresponding to the groove sample are both 60 mm.

2.2) Moving the position of the groove sample or plane mirror along the optical axis, and recording the positions of all groove samples or plane mirrors when clear interference fringes appear in the CCD camera and the number of times of appearance of clear interference fringes, and the position of the groove sample or plane mirror with clear interference fringes is denoted as the interface position. The position of the groove sample or plane mirror with clear interference fringes is specifically the upper surface of the groove sample, the bottom of the groove and the upper surface of the protruding stage in the groove. The upper surface of the protruding stage is parallel to the upper surface of the groove sample or the bottom of the groove. In this embodiment, the upper surface of the groove sample and the bottom of the groove are taken as an example, so the number of times of appearance of clear interference fringes is twice. The direction along the optical axis is a direction parallel to the beam direction at the groove sample or plane mirror.

2.3) Moving the position of the groove sample or plane mirror along the optical axis again, using the CCD camera to collect groove interferograms at a preset step size and number each groove interferogram in order, and the region that is not within the required range above and below the interface position is the fast acquisition region, and only the serial numbers of all groove interferograms in this region need to be obtained, selecting the required range above and below all interface positions and groove interferograms at all interface positions, taking the required range above and below one interface position and the groove interferogram at the current interface position as a group of groove interferograms of the groove sample, thereby obtaining two groups of groove interferograms of the groove sample and the serial number corresponding to each groove interferogram in each group. The number of groove samples is the same as the number of times of appearance of clear interference fringes. Since the visible light spectral range is 380-780 nm, theoretically the recommended required range falls within 3 um. In the specific implementation, the required range is 2 um. The preset step size is within 200 nm, which is determined according to the spectral width actually adopted. In the specific implementation, the preset step size is 80 nm.

3) Performing grayscale processing on each group of groove interferograms of the groove sample to obtain a corresponding groove grayscale interferogram, calculating the contrast of the each group of groove grayscale interferograms, and recording the maximum contrast of the current group of groove grayscale interferograms.

In the step 3), calculating the contrast of each group of groove grayscale interferograms is specifically set by the following formula:

$$J = \frac{I\max - I\min}{I\max + I\min}$$

In the formula, J is the contrast of the groove grayscale interferogram, Imax is the maximum grayscale value of the groove grayscale interferogram, and Imin is the minimum grayscale value of the groove grayscale interferogram.

4) According to the current group of groove interferograms and the serial number corresponding to each groove interferogram in the current group, using the centroid method or the difference centroid method to perform local three-dimensional reconstruction of the current group of groove interferograms to obtain a 3D reconstruction diagram of the local structure corresponding to the current group of groove interferograms.

5) Dividing the three-dimensional reconstruction diagram of the local structure in a direction perpendicular to the direction of fringe development in the groove interferogram, the fringe development direction is the fringe extension direction, and obtaining each sub-region of the three-dimensional reconstruction diagram of the local structure, calculating the contrast of each sub-region, and determining whether each sub-region is an interface region according to a preset difference threshold and the maximum contrast. In the specific implementation, the preset difference threshold is 0.1. If the sub-region is an interface region, recording the coordinate parameters of the current sub-region, otherwise, not recording the coordinate parameters of the current sub-region; obtaining the coordinate parameters of all interface regions; extracting the interface reconstruction diagram in the 3D reconstruction diagram of the local structure according to the coordinate parameters of all interface regions.

Figure 6:
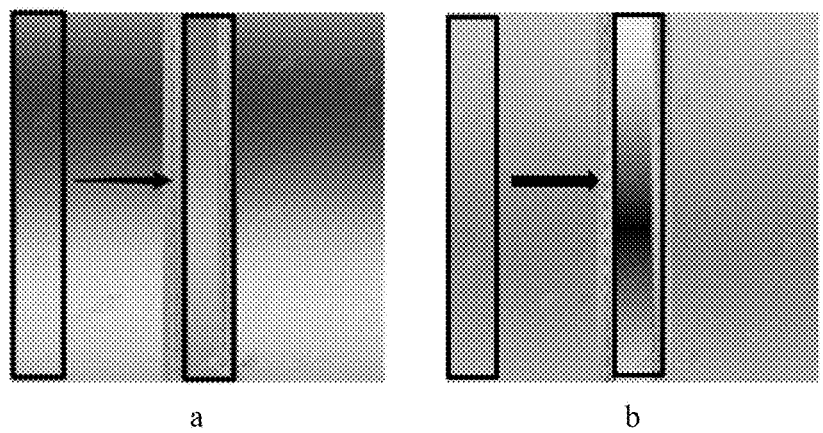
FIG. 6 is a contrast comparison process diagram.

As shown in FIG. 6, a in FIG. 6 is an iso-optical path interferogram on the upper surface of the deep groove. The contrasts of the two sub-regions framed in the figure are different. The contrast value of the sub-region on the left is similar to the overall contrast value of the 3D reconstruction map of the local structure. On the other hand, the contrast value of the sub-region on the right will decrease significantly compared to the contrast value of the whole image because the sub-region on the right is far away from the iso-optical path position. b in FIG. 6 is the iso-optical path interferogram of the lower surface of the deep groove. The contrast values of the two sub-regions are completely opposite, that is, the sub-region on the right is at an iso-optical path position, so the contrast difference between the contrast of the sub-region on the right and the contrast of the whole image is small. Since the sub-region on the left is far away from the iso-optical path position, so the contrast difference between the contrast of the sub-region on the left and the contrast of the whole image is large.

In the step 5), the step of determining whether all the sub-regions are interface regions according to the preset difference threshold and the maximum contrast is specifically as follows:

Taking the absolute value of the contrast difference between the contrast of each sub-region and the maximum contrast as the contrast difference of the current sub-region. If the contrast difference of the current sub-region is less than or equal to the preset difference threshold, then the current sub-region is the interface region, if the contrast difference of the current sub-region is greater than the preset difference threshold, then the current sub-region is not the interface region.

6) Repeating steps 3)-5) for the remaining groups of groove interferograms of the groove sample to obtain the interface reconstruction diagrams corresponding to all groups of groove interferograms of the groove sample. In the white light interference system, wide-spectrum light sources with different spectral widths are adopted, and the interference distances that produce clear fringes near the iso-optical path position are different. When the optical path is smaller than the interference distance, clear interference fringes will be produced. When the optical path is greater than the interference distance, there will be no interference fringes. If the groove depth is within the interference distance, the groove is a shallow groove, and interference fringes on the upper and lower surfaces will be included in the same groove interferogram; if the groove depth is greater than the interference distance, the groove is a deep groove, and the interference fringes on the upper and lower surfaces will not be included in the same groove interferogram.

Figure 5:
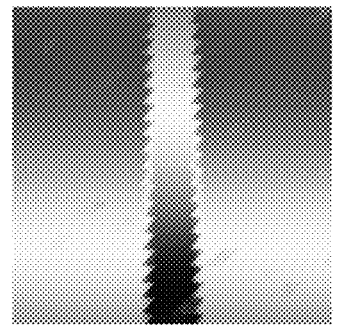
FIG. 5 is a comparison of groove interferograms at different depths.
Figure 5:
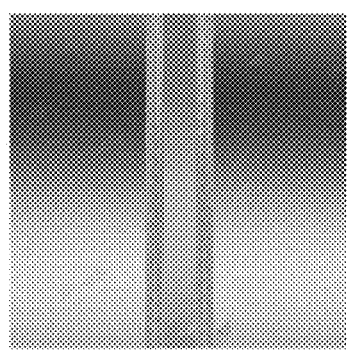
Figure 5:
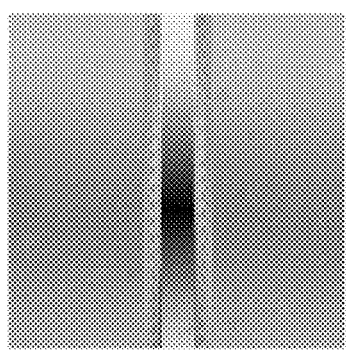

As shown in FIG. 5, a of FIG. 5 is an interface reconstruction diagram of a shallow groove, and the depth of the shallow groove sample adopted is 100 nm. b of FIG. 5 and c of FIG. 5 are the interface reconstruction diagrams of deep grooves. The depth of the deep groove sample adopted is 300 um. b of FIG. 5 is an interface reconstruction diagram collected at the iso-optical path position on the upper surface. c of FIG. 5 is an interface reconstruction diagram collected at the iso-optical path position on the lower surface. Contrast differences in different region in the image are clearly exhibited.

7) After splicing the interface reconstruction diagrams corresponding to all groups of groove interferograms of the groove sample, a three-dimensional structural reconstruction diagram of the groove sample is obtained, measuring the depth and width of the groove sample according to the three-dimensional structural reconstruction diagram.

Figure 7:
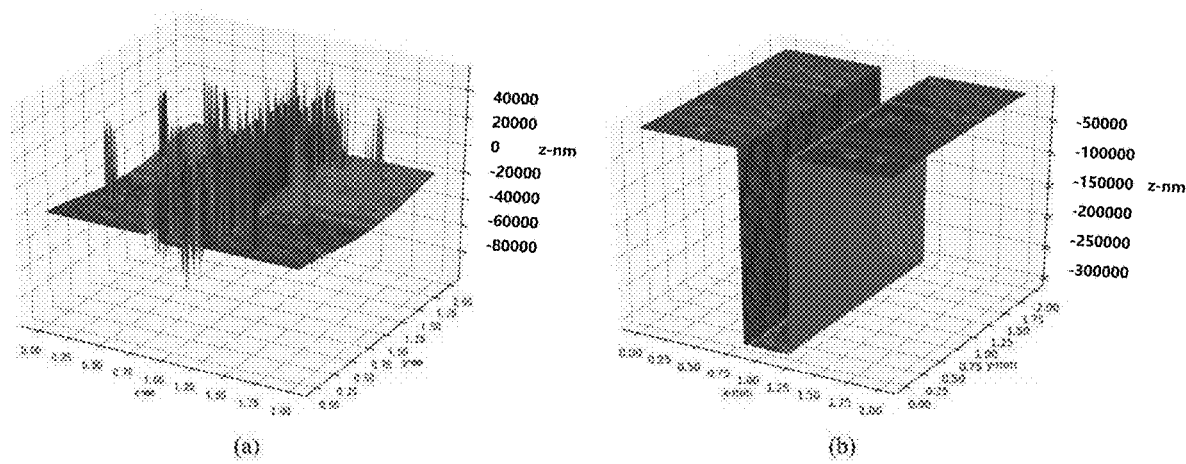
FIG. 7 is a comparison diagram of a reconstruction result obtained by using the interpolation centroid method and the three-dimensional structure reconstruction diagram of the present disclosure.

In specific implementation, the present disclosure uses Virtuallab Fusion to simulate the acquisition of groove samples to obtain 4000 groove interferograms, and uses Python to perform three-dimensional reconstruction of the collected 4000 groove interferograms. FIG. 7 shows the results obtained by using the existing method and the method of the present disclosure. In the existing method, the reconstruction time required by directly using the centroid method is 1.54 s.

(a) of FIG. 7 is a three-dimensional structure reconstruction diagram obtained by performing reconstruction through the interpolation centroid method among existing methods, and the reconstruction time required by using the method of the present disclosure is 0.04 s. (a) of FIG. 7 is a three-dimensional structure reconstruction diagram obtained by the reconstruction method of the present disclosure. It can be seen that the present disclosure not only has significant improvement in reconstruction speed, but also the reconstruction effect is greatly enhanced.

What is claimed is:

1. A fast measurement method for a micro-nano deep groove structure based on white light interference, wherein comprising the following steps:
   1) establishing a white light interference system, comprising a light source, a beam splitter, a CCD camera and a plane mirror; wherein a white light generated by the light source is incident into the beam splitter for transmission and reflection, and the transmitted light of the beam splitter is reflected by the plane mirror and then incident back into the beam splitter, the transmitted light that is incident back into the beam splitter is reflected in the beam splitter, and the reflected light beam serves as a first beam and is incident on the CCD camera; the reflected light of the beam splitter is reflected by a groove of a groove sample and then incident back into the beam splitter, the reflected light that is incident back to the beam splitter is transmitted through the beam splitter, the transmitted beam serves as a second beam and is incident on the CCD camera; an interference of the first beam and the second beam is detected by the CCD camera, and the CCD camera detects and acquires a groove interferogram;

2) using the white light interference system to measure a structure of the groove, and recording the number of times of appearance of clear interference fringes in the CCD camera, according to the number of times of the appearance of the clear interference fringes, the CCD camera collects and obtains a plurality of groups of the groove interferograms and records a serial number corresponding to each of the groove interferograms in each of the groups;

3) performing grayscale processing on the each group of the groove interferograms of the groove sample to obtain a corresponding groove grayscale interferogram, calculating a contrast of a current group of the groove grayscale interferograms, and recording a maximum contrast of the current group of the groove gray scale interferograms;

4) according to the current group of the groove interferograms and the serial number corresponding to each of the groove interferograms in the current group, using a centroid method or a difference centroid method to perform local three-dimensional reconstruction of the current group of the groove interferograms to obtain a 3D reconstruction diagram of a local structure corresponding to the current group of the groove interferograms;

5) dividing the three-dimensional reconstruction diagram of the local structure in a direction perpendicular to a direction of fringe development in the groove interferogram, obtaining each sub-region of the three-dimensional reconstruction diagram of the local structure, calculating a contrast of each sub-region, and determining whether each of the sub-regions is an interface region according to a preset difference threshold and the maximum contrast; if the sub-region is an interface region, recording coordinate parameters of a current sub-region, otherwise, not recording the coordinate parameters of the current sub-region; obtaining the coordinate parameters of all of the interface regions; extracting an interface reconstruction diagram in the 3D reconstruction diagram of the local structure according to the coordinate parameters of all of the interface regions;

6) repeating steps 3)-5) for remaining groups of the groove interferograms of the groove sample to obtain interface reconstruction diagrams corresponding to all of the groups of the groove interferograms of the groove sample;

7) after splicing the interface reconstruction diagrams corresponding to all of the groups of the groove interferograms of the groove sample, obtaining a three-dimensional structural reconstruction diagram of the groove sample, and measuring a depth and a width of the groove sample according to the three-dimensional structural reconstruction diagram.

2. The fast measurement method for the micro-nano deep groove structure based on white light interference according to claim 1, wherein the step 2) is specifically as follows:

2.1) placing the groove sample obliquely along a length direction of the groove, adjusting an inclination angle of the groove sample and a distance between the plane mirror and the beam splitter in the white light interference system or between the groove sample and the beam splitter along an optical axis, until the fringes are generated on an image captured by the CCD camera, fixing the inclination angle of the groove sample, the groove sample and the plane mirror;

2.2) moving a position of the groove sample or the plane mirror along the optical axis, and recording positions of all of the groove samples or the plane mirrors when the clear interference fringes appear in the CCD camera and the number of times of the appearance of the clear interference fringes, wherein the position of the groove sample or the plane mirror with the clear interference fringes is denoted as an interface position;

2.3) moving the position of the groove sample or the plane mirror along the optical axis again, using the CCD camera to collect the groove interferograms at a preset step size and number each of the groove interferograms in order, selecting a required range above and below all of the interface positions and the groove interferograms at all of the interface positions, taking the required range above and below one of the interface positions and the groove interferogram at a current interface position as a group of groove interferograms of the groove sample, thereby obtaining a plurality of groups of the groove interferograms of the groove sample and the serial number corresponding to each of the groove interferograms in each of the groups.

3. The fast measurement method for the micro-nano deep groove structure based on white light interference according to claim 1, wherein in the step 3), calculating the contrast of each of the groups of the groove grayscale interferograms is specifically set by the following formula:

$$J = \frac{I\max - I\min}{I\max + I\min}$$

wherein, J is the contrast of the groove grayscale interferogram, Imax is the maximum grayscale value of the groove grayscale interferogram, and Imin is a minimum grayscale value of the groove grayscale interferogram.

4. The fast measurement method for the micro-nano deep groove structure based on white light interference according to claim 1, wherein in the step 5), the step of determining whether all of the sub-regions are the interface regions according to the preset difference threshold and the maximum contrast is specifically as follows:

taking an absolute value of a contrast difference between the contrast of each of the sub-regions and the maximum contrast as a contrast difference of the current sub-region, if the contrast difference of the current sub-region is less than or equal to the preset difference threshold, then the current sub-region is the interface region, if the contrast difference of the current sub-region is greater than the preset difference threshold, then the current sub-region is not the interface region.

5. The fast measurement method for the micro-nano deep groove structure based on white light interference according to claim 2, wherein that, the position of the groove sample or the plane mirror with the clear interference fringes is an upper surface of the groove sample, a bottom of the groove and an upper surface of a protruding stage in the groove, wherein the upper surface of the protruding stage is parallel to the upper surface of the groove sample or the bottom of the groove.

* * * * *